United States Patent
Ellison et al.

(10) Patent No.: US 8,468,579 B2
(45) Date of Patent: Jun. 18, 2013

(54) TRANSFORMATION OF SEQUENTIAL ACCESS CONTROL LISTS UTILIZING CERTIFICATES

(75) Inventors: Carl Melvin Ellison, Seattle, WA (US); Paul J. Leach, Seattle, WA (US); Butler Wright Lampson, Cambridge, MA (US); Melissa W. Dunn, Woodinville, WA (US); Ravindra Nath Pandya, Clyde Hill, WA (US); Charles William Kaufman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1493 days.

(21) Appl. No.: 11/764,034

(22) Filed: Jun. 15, 2007

(65) Prior Publication Data

US 2008/0313712 A1 Dec. 18, 2008

(51) Int. Cl.
*G06F 21/00* (2006.01)

(52) U.S. Cl.
USPC ...... 726/4; 726/5; 726/11; 713/156; 713/184; 709/229; 380/47; 380/286; 705/51; 705/59; 455/411

(58) Field of Classification Search
USPC .......................................... 726/4–5
See application file for complete search history.

(56) References Cited

U.S. PATENT DOCUMENTS

| | | | |
|---|---|---|---|
| 5,283,830 A | 2/1994 | Hinsley et al. | |
| 5,315,657 A * | 5/1994 | Abadi et al. ...................... 726/4 |
| 5,765,153 A | 6/1998 | Benantar et al. | |
| 5,825,877 A | 10/1998 | Dan et al. | |
| 6,279,111 B1 * | 8/2001 | Jensenworth et al. .......... 726/10 |
| 6,321,334 B1 | 11/2001 | Jerger et al. | |
| 6,381,602 B1 | 4/2002 | Shoroff et al. | |
| 6,412,070 B1 | 6/2002 | Van Dyke et al. | |
| 6,487,605 B1 | 11/2002 | Leung | |
| 6,625,603 B1 | 9/2003 | Garg et al. | |
| 6,651,096 B1 | 11/2003 | Gai et al. | |
| 6,883,100 B1 | 4/2005 | Elley et al. | |

(Continued)

FOREIGN PATENT DOCUMENTS

WO 2006012589 A2 2/2006

OTHER PUBLICATIONS

Oh et al., "Task—role-based access control model", Information Systems 28 (2003) 533-562, Received Nov. 3, 2000; received in revised form Apr. 22, 2002; accepted May 1, 2002.*

(Continued)

*Primary Examiner* — Morshed Mehedi
(74) *Attorney, Agent, or Firm* — Wolfe-SBMC

(57) ABSTRACT

The subject disclosure pertains to systems and methods that facilitate managing access control utilizing certificates. The systems and methods described herein are directed to mapping an access policy as expressed in an access control list to a set of certificates. The set of certificates can be used to grant access to resources in the manner described by the ACL. The certificates can be distributed to entities for use in obtaining access to resources. Entities can present certificates to resources as evidence of their right to access the resources. The access logic of the sequential ACL can be transformed or mapped to a set of order independent certificates. In particular, each entry, position of the entry in the list and any preceding entries can be analyzed. The analysis can be used to generate order independent certificates that provide access in accordance with the access policy communicated in the ACL.

20 Claims, 15 Drawing Sheets

U.S. PATENT DOCUMENTS

| | | | |
|---|---|---|---|
| 6,986,062 B2 | 1/2006 | Carpenter | |
| 6,990,492 B2 | 1/2006 | Gupta | |
| 7,065,783 B2 | 6/2006 | Rygaard | |
| 7,107,446 B2 | 9/2006 | Gensler, Jr. et al. | |
| 7,131,000 B2 | 10/2006 | Bradee | |
| 7,624,424 B2* | 11/2009 | Morita et al. | 726/1 |
| 7,752,179 B1 | 7/2010 | Brown | |
| 7,900,248 B2 | 3/2011 | Ellison et al. | |
| 8,132,237 B2* | 3/2012 | Kang | 726/4 |
| 8,166,515 B2* | 4/2012 | Hill et al. | 726/1 |
| 8,281,383 B2* | 10/2012 | Levy-Abegnoli et al. | 726/11 |
| 2003/0014636 A1 | 1/2003 | Ahlbrand | |
| 2003/0023774 A1* | 1/2003 | Gladstone et al. | 709/328 |
| 2003/0046072 A1 | 3/2003 | Ramaswamy et al. | |
| 2003/0079123 A1* | 4/2003 | Mas Ribes | 713/156 |
| 2003/0084331 A1* | 5/2003 | Dixon et al. | 713/200 |
| 2003/0088786 A1 | 5/2003 | Moran et al. | |
| 2004/0006621 A1 | 1/2004 | Bellinson et al. | |
| 2004/0039906 A1* | 2/2004 | Oka et al. | 713/156 |
| 2004/0193546 A1* | 9/2004 | Tokutani et al. | 705/59 |
| 2004/0193917 A1* | 9/2004 | Drews | 713/201 |
| 2004/0205342 A1* | 10/2004 | Roegner | 713/168 |
| 2005/0044396 A1* | 2/2005 | Vogel et al. | 713/200 |
| 2005/0044399 A1* | 2/2005 | Dorey | 713/200 |
| 2005/0055570 A1 | 3/2005 | Kwan et al. | |
| 2005/0135623 A1* | 6/2005 | Bahr | 380/270 |
| 2005/0204133 A1 | 9/2005 | LaLonde | |
| 2005/0278785 A1 | 12/2005 | Lieberman | |
| 2006/0015741 A1 | 1/2006 | Carroll | |
| 2006/0031679 A1 | 2/2006 | Soltis, Jr. et al. | |
| 2006/0031923 A1* | 2/2006 | Kanai | 726/1 |
| 2006/0206707 A1 | 9/2006 | Kostal et al. | |
| 2007/0150417 A1 | 6/2007 | Hu | |
| 2007/0220614 A1 | 9/2007 | Ellis et al. | |
| 2007/0226488 A1* | 9/2007 | Lin et al. | 713/156 |
| 2008/0028206 A1* | 1/2008 | Sicard et al. | 713/156 |
| 2008/0052291 A1 | 2/2008 | Bender | |

OTHER PUBLICATIONS

Biskup. et al., Towards a Credential-Based Implementation of Compound Access Control Policies, http://ls6-www.informatik.uni-dortmund.de/issi/archive/literature/2003/Biskup_Wortmann_2003a.pdf, Nov. 11, 2003, 23 pages, Dortmund Germany.

Swift, et al., Improving the Granularity of Access Control for Windows 2000, http://www.cs.wisc.edu/~swift/papers/tissec.pdf, May 2001, 44 pages, Chantilly, VA, 6th ACM Symposium on Access Control Models and Technologies.

Zhuo, On Fine-Grained Access Control for XML, http://uwspace.uwaterloo.ca/bitstream/10012/1058/1/dhzhuo2003.pdfCHAPTER 2., Waterloo Ontario Canada, 2003, 124 pages.

McCollum, et al., Beyond the Pale of MAC and DAC—Defining New Forms of Access Contmlt, http://ieeexplore.ieee.org/iel2/300/2323/00063850.pdf?isNumber=, Unisys Independent Research and Development,11 pages.

Ellison, et al., SPKI Certificate Theory, http://www.ietf.org/rfc/rfc2693.txt, Sep. 1999, 41 pages, The Internet Society.

How to Manage ACLs, http://www.enterasys.com/support/manuals/RtrSvcsMgr2.1.1/docs/a_ht_manage_acls.html, Last accessed on Jun. 15, 2007, 6 pages.

"Final Office Action", U.S. Appl. No. 11/761,170, (Sep. 7, 2011), 14 pages.

"Non-Final Office Action", U.S. Appl. No. 11/756,393, (May 24, 2010), 13 pages.

"Notice of Allowance", U.S. Appl. No. 11/756,393, (Sep. 30, 2010), 4 pages.

"Supplemental Notice of Allowance", U.S. Appl. No. 11/756,393, (Nov. 17, 2010), 3 pages.

Bao-Chyuan, Guan et al., "An Extended Object-Oriented Security Model for High Secure Office Environments", *Security Technology, 2003. Proceedings. IEEE 37th Annual 2003 International Carnahan Conference.*, (2003), pp. 57-61.

Pereira, Anil L., et al., "Role-Based Access Control for Grid Database Services Using the Community Authorization Service", *Dependable and Secure Computing*, IEEE Transactions on vol. 3, Issue 2, available at <http://citeseerx.ist.psu.edu/viewdoc/download?doi=10.1.1.150.7665&rep=rep1&type=pdf>,(2006), pp. 156-166.

Sun, Yan L., et al., "Analysis and Protection of Dynamic Membership Information for Group Key Distribution Schemes", *Information Forensics and Security*, IEEE Transactions on vol. 2, Issue 2, available at <http://www.ele.uri.edu/nest/paper/JIFS_GDI_v6.pdf>,(2007), 30 pages.

"Non-Final Office Action", U.S. Appl. No. 11/761,170, (Oct. 4, 2012), 13 pages.

"Final Office Action", U.S. Appl. No. 11/761,170, (Jan. 7, 2011),11 pages.

"Non-Final Office Action", U.S. Appl. No. 11/761,170, (Jul. 21, 2010),11 pages.

"Non-Final Office Action", U.S. Appl. No. 11/761,170, (May 12, 2011),13 pages.

U.S. Appl. No. 11/756,393, filed May 31, 2007, Ellison et al.
U.S. Appl. No. 11/761,170, filed Jun. 11, 2007, Ellison et al.

* cited by examiner

TRANSFORMATION OF SEQUENTIAL ACCESS CONTROL LISTS UTILIZING CERTIFICATES

CROSS-REFERENCE

This application is related to U.S. Nonprovisional application Ser. No. 11/756,393 entitled "ACCESS CONTROL NEGATION USING NEGATIVE GROUPS," filed on May 31, 2007. The entirety of which is incorporated by reference herein.

BACKGROUND

Computers and computer networks have become ubiquitous in today's society. Virtually every business utilizes computers and computer networks for tasks such as managing inventory, billing, document preparation, product design and/or production and the like. Similarly, educational institutions and nonprofit organizations utilize computers for research, word-processing and other processes. Individuals of all occupations and lifestyles utilize computers and the Internet to manage bank accounts, prepare of tax returns, view product information, sell and purchase products, download audio and video files, take classes, research topics, and find directions among other things. Further, usage of computers and computer networks will continue to flourish as addition information becomes available.

Improvements in interconnectivity and accessibility have also increased utility of computers and computer networks. Users can access resources remotely to retrieve and generate email, edit and/or create documents and perform similar tasks. Mobile devices such as laptops, smartphones, PDAs or a variety of other devices allow users to access the Internet and other networks. The growth of wireless networks has also increased accessibility and therefore utility of computer networks. Even coffee shops, bowling alleys and libraries may now provide wireless access to customers.

Security and privacy have become critical issues with the increase in collection and accessibility of information. Data can include information crucial to organizations, such as trade secrets, employee information, inventory, customer lists and the like. Data can also include private individual information (e.g., bank records, credit information, and health information). Identity theft has become a major concern. The key is to allow access to individuals or groups of individuals with proper authority and to deny access to others.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns access management for resources such as computer networks, data files and the like. Access control lists (ACLs) are frequently used to manage access to resources for entities and/or groups of entities. ACLs are interpreted as order-dependent lists, in which each entry in the list specifies an entity or group of entities and an action to be taken if the current entity requesting access matches that specification. Consequently, the access policy expressed in an ACL includes not only entries and their associated actions, but also the order in which entries appear within the list.

The systems and methods described herein are directed to mapping an access policy as expressed in an access control list to a set of certificates. The set of certificates can be used to grant access to resources in the manner described by the ACL. As used herein, a certificate is a digitally signed data record in which one party, the issuer, attests to some attribute of a second other party, the subject. Here, certificates can be used to attest to the access rights of an entity. The certificates can be distributed to entities for use in obtaining access to resources. Entities can present certificates to resources as evidence of their right to access the resources.

The access logic of the sequential ACL can be transformed or mapped to a set of order-independent certificates. In particular, each entry, position of the entry in the list and any preceding entries can be analyzed. The analysis can be used to generate order independent certificates that provide access in accordance with the access policy communicated in the ACL.

In at least one aspect of the subject specification, changes in the access policy can be facilitated through use of a separate status component. The status component can maintain information regarding the current state (e.g., valid or invalid) of certificates. The status component can verify status of certificates to resource managers without having the authority to issue certificates. Resource managers can confirm certificate validity with the status component prior to providing access to an entity presenting the certificate. When access rights are updated, the status component can receive information regarding status of certificates.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
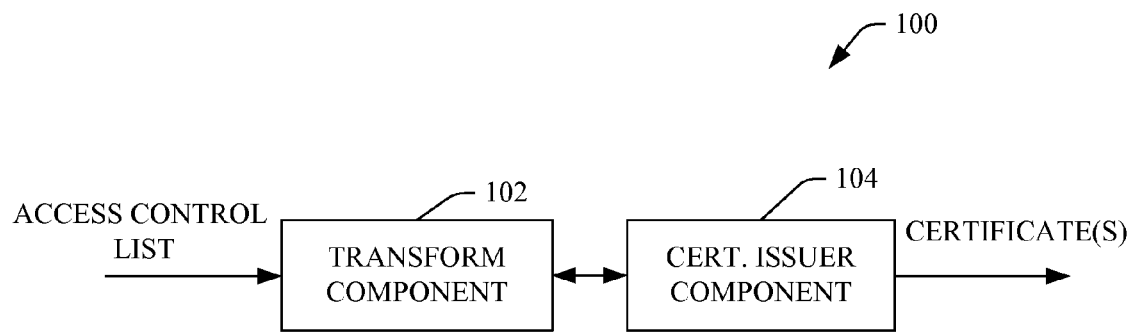
FIG. 1 is a block diagram of a system that facilitates access management utilizing certificates in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Access Control Lists (ACLs) are frequently used to control access to resources. As used herein, the term "resource" includes, but is not limited to, computer networks, data files, software programs, specific program features, and the like. ACLs have traditionally been interpreted as sequential or order-dependent lists, in which each entry in the list specifies an entity or group of entities and an action to be taken if the current entity requesting access matches that specification. ACL entries are also referred to as Access Control Entries (ACEs). An entity can be considered to match an entry if it is either the entity referenced in the ACL entry or a member of the group specified in the entry. Actions associated with entries can be positive (e.g., allowing a particular access) or negative (e.g., denying a particular access).

Groups of entities can be utilized to facilitate access control. For example, a corporation may define individual groups for separate departments within the organization, each group consisting of employees within that department. Access to certain computer networks within the organization may be limited based upon department. For instance, only employees in the accounting or management departments may have access rights to accounting information. Access rights can be updated by modifying the group definitions, rather than requiring update of one or more ACLs. As employees are hired or leave the organization, the employees can be added or deleted from the appropriate department groups. Groups can also include subgroups. As an example, a group that represents a division of an organization can include each department group within that division. Effectively, the division group consists of all employees in each of the department groups included within the division group.

When an entity requests access to a resource, the resource can verify access rights based upon an associated ACL. The typical execution model of an ACL sequentially tests entries against entries in the ACL. Entries can be tested from the top down, one at a time. The ACL can be viewed as a series of if-then-else logic statements. If an entry matches the entity making the request, then the associated action is performed and no further tests of subsequent entries in the ACL are performed. If the entry does match the entity requesting access, then the next entry in the list is tested.

A typical ACE can include multiple fields, depending on how data structures are organized. Each ACE can include a subject that identifies an entity or group of entities. During the matching process, the entity seeking access is compared to the entity or members of the group specified in the subject of the entry. Typical ACEs can include actions including, but not limited to, ALLOW or DENY. These actions indicate what act is to be performed if the entity requesting access matches the subject. An ACE can also include permission information, specifying the type of permission to grant the entity if the action allows access. For instance, an entity may be granted read permission for a data file, but not write permission.

Access can also be controlled using negation, where one or more entities are specifically denied access, rather than by permitting access only to those entities that are affirmatively granted access. For access control using negation, the DENY action can be used to refuse access to an entity or group of entities. Accordingly, if a requesting entity matches the subject of the entry and the associated action is DENY, the entity is refused access to the resource.

Many system administrators are familiar with ACLs. Consequently, system administrates are likely to be comfortable using ACL, order dependent logic to manage access to resources. However, there are also advantages to using certificates to manage resource access. Certificates allow for ease in distribution of the access policy. Furthermore, in a certificate access system when an entity requests resources, the entity can present the certificate as evidence of access rights, without requiring the resource to contact a third party to verify rights.

FIG. 1 illustrates a system 100 that facilitates access management by using access control list information to generate a set of certificates in accordance with an aspect of the subject matter disclosed herein. The system 100 can include a transform component 102 that transforms access control list information, such that the access policy and logic inherent in the sequential structure of an ACL can be expressed in a set of order independent certificates.

The system 100 can also include a certificate issuer component 104 that generates one or more certificates to manage access to resources based upon the transformation of the access list logic. As used herein, a certificate is a digitally signed data record in which one party, the issuer, attests to some attribute of a second other party, the subject. Here, certificates can be used to attest to the access right of an entity to a particular resource. Typically, the entity that is the subject of a certificate can hold that certificate and present it to a resource or resource manager when requesting access to the resource.

The certificate issuer component 104 can proactively generate certificates for every entity granted access rights. There can be creation of a digital signature with public-key algorithms, but also with symmetric-key algorithms. Alternatively, the certificate issuer component 104 can generate certificates upon request. Certificates can be generated as needed for entities to establish permission necessary to access resources and are not necessarily generated for all entities with access rights.

Figure 2:
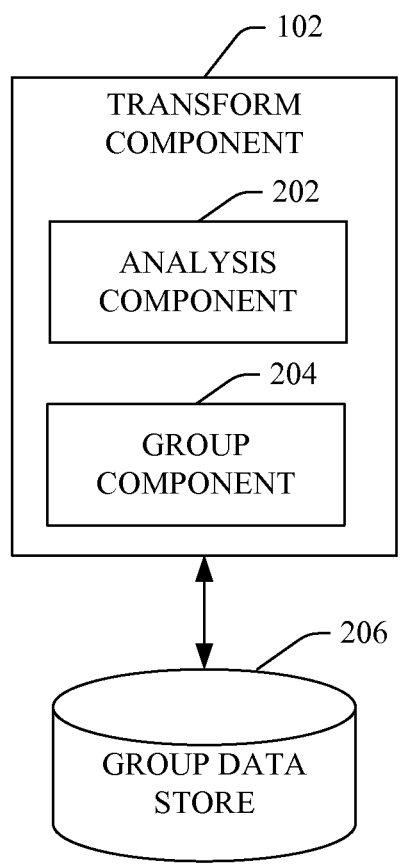
FIG. 2 is a block diagram of an aspect of a transform component in accordance with an aspect of the subject matter disclosed herein.

Referring now to FIG. 2, a more detailed depiction of an aspect of the transform component 102 is illustrated. The transform component 102 can receive ACL information and transform the sequential access logic of the ACL to order independent access logic. The transformed logic can be used to generate certificates to carry out access control in a manner substantially equivalent to the ACL. The transform component 102 can include an analysis component 202 that analyzes the received ACL information and a group component 204 that evaluates groups of entities used in the ACL information.

ACL information can include a text specification of an ACL, any logic structure describing an ACL or any other information related to an ACL. The analysis component 204 can parse and/or evaluate the received ACL information to determine both explicit access logic as described in access list entries as well as logic implicit in the structure or order of the ACL. The transform component 102 can translate the logic expressed in the ACL information to generate certificates for controlling management of access.

During evaluation of an entity using a traditional ACL, the ACL is examined from the top of the list downward. According to one embodiment, examination terminates with any match of the entity to a subject of an entry in the list or ACE. According to another embodiment, examination terminates when enough ACEs have been examined that match and grant requested permissions. Consequently, the structure or order of the ACL entries results in an implicit AND operation. Once a matching entry subject is located, processing of the ACL is terminated and subsequent ACEs are not examined. Accordingly, an ACE will be examined only if the subjects of all preceding ACEs did not match the entity being evaluated. Each ACE in an ACL is logically treated as if its subject were modified with a logical AND with the logical NOT of the subject of each prior ACE.

The group component 204 can construct groups or transformed subjects that reflect the logic implicit in the order of ACEs within an ACL without requiring the ACL order. The group component 204 can evaluate each ACE and generate a transformed subject that is independent of list order. This transformed subject can be expressed as the initial subject of the evaluated ACE excluding the subjects of all entries that precede the evaluated ACE within the ACL. Accordingly, for the first entry in an ACL, represented as $ACE_1$, the new group or subject would be equal to the initial subject, represented as $S_1$, since there are no preceding entries within the ACL. The new group or subject of the second entry, $ACE_2$, would equal to the subject of the second entry, $S_2$, excluding the subject of the first entry, $S_1$. The transformed subject for the second entry can be represented by a subtraction of groups: $S_2$-$S_1$. Similarly, the following exemplary formula can be used to determine the transformed subject for an entry, k, in an ACL:

$$\text{Transformed Subject of } ACE_k = S_k - [\text{union from 1 to } k-1 \text{ of } S_i]$$

Here, the subject is equal to the initial subject of the ACE, excluding the subject of every ACE that preceded the ACE in the ACL. For each ACE, if the action within the ACL is an ALLOW entry, certificates can be issued for entities within the transformed subject. If the action is a DENY entry, then no certificates are issued.

Negative groups and/or subtraction groups can be used in transformation of ACE subjects. For example, the transformed subject for the second entry in an ACL can be represented as the initial subject or group, $S_2$, and a negative group based upon the subject of the first entry in the ACL, $S_1$. A negative group can be based upon any other specified group. Here, a negative group consists of any entities not included within the specified group. This specified group, which serves as a basis for the negative group, is referred to herein as the base group of the negative group. For instance, for a base group 'G', the negative group 'not-G' would include any entities that are not included within base group 'G' or any subgroups that are included in base group 'G'. In addition, the base group could consist of a single entity. For example, for entity 'E' the group 'not-entity E' would include any other entity except for entity 'E'.

The transformed subject can be represented as a subtraction group. Subtraction groups are based upon at least two pre-existing groups. For instance, an entity is considered a member of subtraction group 'A-B', if the entity is in group 'A', but not in group 'B'. The group component can determine membership in group 'A-B' by requesting membership information for group 'A' and for group 'B' from the appropriate group authorities.

If an entity is not a member of group 'A', the entity will not be a member of the subtraction group 'A-B'. If the entity is a member of group 'A', then the subtraction component determines whether the entity is a member of the negative group 'not-B'. If the entity is a member of group 'A' and it is also a member of group 'not-B', then the entity is a member of subtraction group 'A-B.'

Unlike negative groups, subtraction groups have a fixed limit on the number of members within the subtraction group. For instance, subtraction group 'A-B' cannot have more members than group 'A'. Because the subtraction group is limited, it can be expressed as a list of members and may be maintained in a group data store 206 or other data store.

Alternatively, certificates can be used as evidence of membership in a subtraction group.

The group component 204 can maintain or obtain information from one or more group data stores 206. As used herein, a data store is a collection of data (e.g., a set of files, a database, cache or buffer). A single group data store 206 is depicted for simplicity, however any number of group data stores 206 can be utilized to manage groups. Moreover, group data stores can be maintained in different domains.

Each group can include an identifier (e.g., a Microsoft Windows System Identifier (SID)) that uniquely identifies the group and can be used to determine the authority that defines membership within the group. For example, in the Microsoft Windows operating system, a local machine may have authority for SIDs defined on the local machine, whereas a domain controller may have authority for SIDs defined within the corporate domain.

Groups are often represented as a list of their members. Typically, a negative group would have a very large list of members. Negative groups would include all entities in the world, except for those contained in the group on which the negative is based. Many systems limit the total number of entities contained within a group. Consequently, it may not be possible to list members of many negative groups. In aspects, negative groups can be managed using certificates rather than by explicit listings of members. Members of a negative group can be issued certificates that identify the entity as a member of the negative group.

The following discloses information related to converting sequential ACLs to order-independent forms, including but not limited to certificates. It is to be appreciated that information disclosed herein can be used concerning at least one aspect of the subject specification.

An Access Control List (ACL) is typically a sequential list of Access Control Entries (ACEs). An ACE commonly includes a subject (e.g., some group or group expression), a set of permissions, and a Boolean: ALLOW vs. DENY. An ACL is processed sequentially in many instances, typically against a set of permissions.

The following discloses information regarding an example algorithm. For at least one permission in the ACL to be converted, there is construction of a pruned ACL—which includes ACEs that refer to that permission. A surviving ACE retains its order with respect to other surviving ACEs and retains an ALLOW/DENY Boolean.

For at least one ALLOW ACE in a pruned ACL, there is construction of about one order-independent entry (e.g., an entry that can be issued by certificate.) That entry will have as its subject, the subject of the ACE minus the union of the subjects of preceding DENY ACEs. It will have the at least one permission under consideration and will be of type ALLOW.

At the end of this process, order-independent entries that have identical subject expressions can be grouped together into one order-independent entry with the union of their permissions.

The following discloses an example related to the algorithm.

| Index | Subject | Permissions | Allow/Deny |
|---|---|---|---|
| 0 | $G_0$ | A, B, F | ALLOW |
| 1 | $G_1$ | A, C, E | DENY |
| 2 | $G_2$ | B, C, D | ALLOW |
| 3 | $G_3$ | A, E, F | ALLOW |

This discloses an example ACL

There are six permissions defined in this ACL: A, B, C, D, E and F. There is construction of six pruned ACLs, as shown below:

| Index | Subject | Allow/Deny | Issued Order-independent Subject |
|---|---|---|---|
| 0 | $G_0$ | ALLOW | $G_0$ |
| 1 | $G_1$ | DENY | |
| 3 | $G_3$ | ALLOW | $G_3$-$G_1$ |

Pruned ACL for Permission A

| Index | Subject | Allow/Deny | Issued Order-independent Subject |
|---|---|---|---|
| 0 | $G_0$ | ALLOW | $G_0$ |
| 2 | $G_2$ | ALLOW | $G_2$ |

Pruned ACL for Permission B

| Index | Subject | Allow/Deny | Issued Order-independent Subject |
|---|---|---|---|
| 1 | $G_1$ | DENY | |
| 2 | $G_2$ | ALLOW | $G_2$-$G_1$ |

Pruned ACL for Permission C

| Index | Subject | Allow/Deny | Issued Order-independent Subject |
|---|---|---|---|
| 2 | $G_2$ | ALLOW | $G_2$ |

Pruned ACL for Permission D

| Index | Subject | Allow/Deny | Issued Order-independent Subject |
|---|---|---|---|
| 1 | $G_1$ | DENY | |
| 3 | $G_3$ | ALLOW | $G_3$-$G_1$ |

Pruned ACL for Permission E

| Index | Subject | Allow/Deny | Issued Order-independent Subject |
|---|---|---|---|
| 0 | $G_0$ | ALLOW | $G_0$ |
| 3 | $G_3$ | ALLOW | $G_3$ |

Pruned ACL for Permission F

After unifying entries with same subjects, there are the following order-independent entries:

| Subject | Permissions |
| --- | --- |
| $G_0$ | A, B, F |
| $G_3$-$G_1$ | A, E |
| $G_2$ | B, D |
| $G_2$-$G_1$ | C |
| $G_3$ | F |

Figure 3:
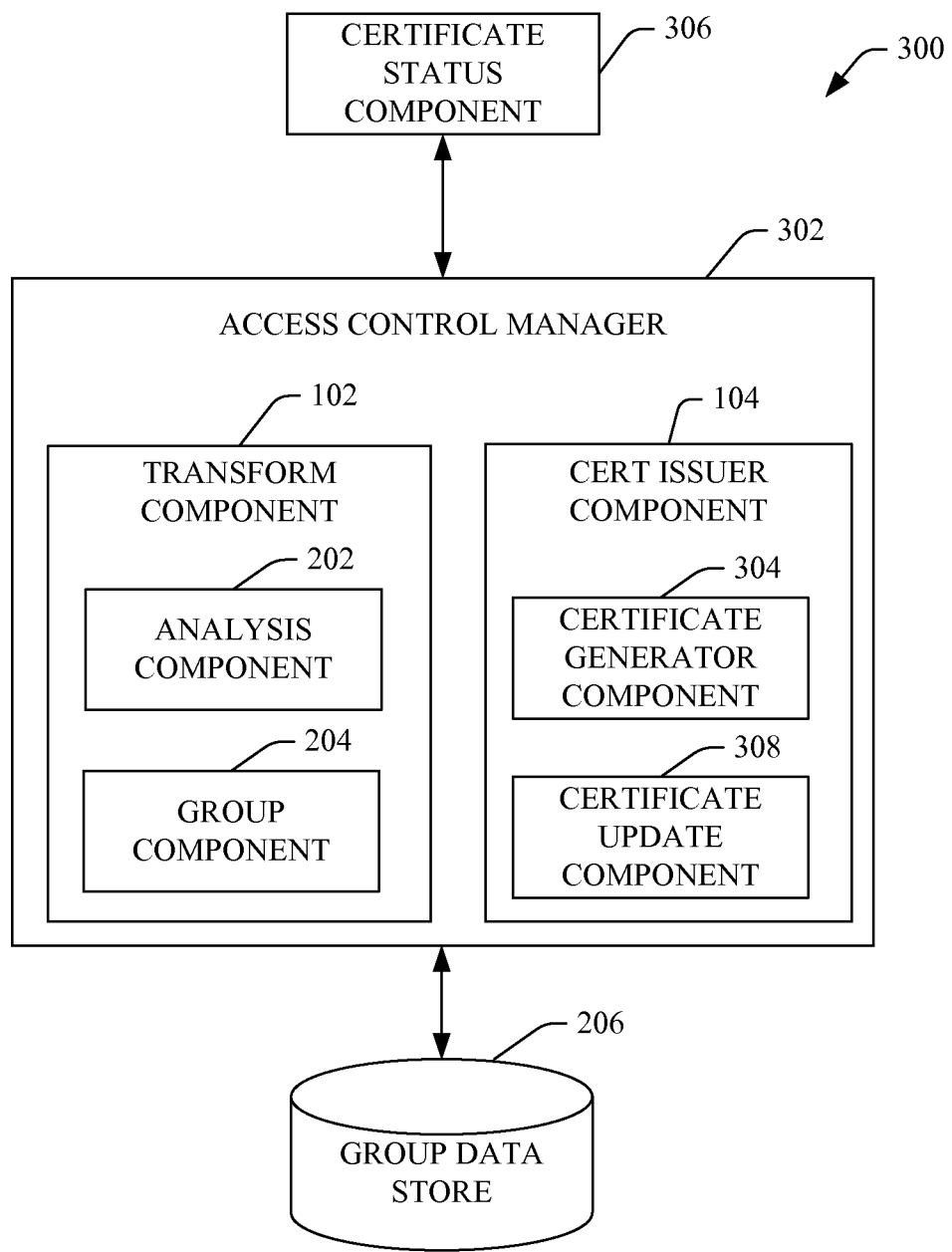
FIG. 3 is a block diagram of a system that facilitates access management utilizing certificates and online status checking in accordance with an aspect of the subject matter disclosed herein.

Turning now to FIG. 3, an exemplary system 300 that facilitates access management is illustrated. The system 300 can include an access control manager 302 that includes a transform component 102 and certificate issuer component 104 described with respect to FIGS. 1 and 2. The certificate issuer component 104 can include a certificate generator component 304 that can sign information necessary to generate certificates. The signed information can include information identifying a particular entity, resource, permissions, identity of issuer, and other access information. The signed information can also include a specified period of validity or lifetime during which the certificate is valid. The lifetime can include a start date and time after which the certificate can be used to access a resource, as well as an expiration date and time, after which the certificate is invalid and can no longer be used to access the resource.

A certificate status component 306 can maintain information regarding current state of issued certificates (e.g., valid, revoked and/or expired). The certificate status component 306 can obtain information regarding certificates from a certificate update component 308. Furthermore, the certificate status component 306 can obtain information from multiple access control managers. The certificate status component 306 can be independent of the access control manager 302 as illustrated, or may be a component of the access control manager 302.

The certificate status component 306 allows resource managers (not shown) to confirm the validity and current state of issued certificates. For example, if a certificate is revoked, the certificate update component 308 can notify the certificate status component 306 of the revocation. If an entity attempts to utilize the certificate after revocation, a resource manager can contact the certificate status component 306 to verify certificate validity, and the certificate can be rejected for invalidity.

Figure 4:
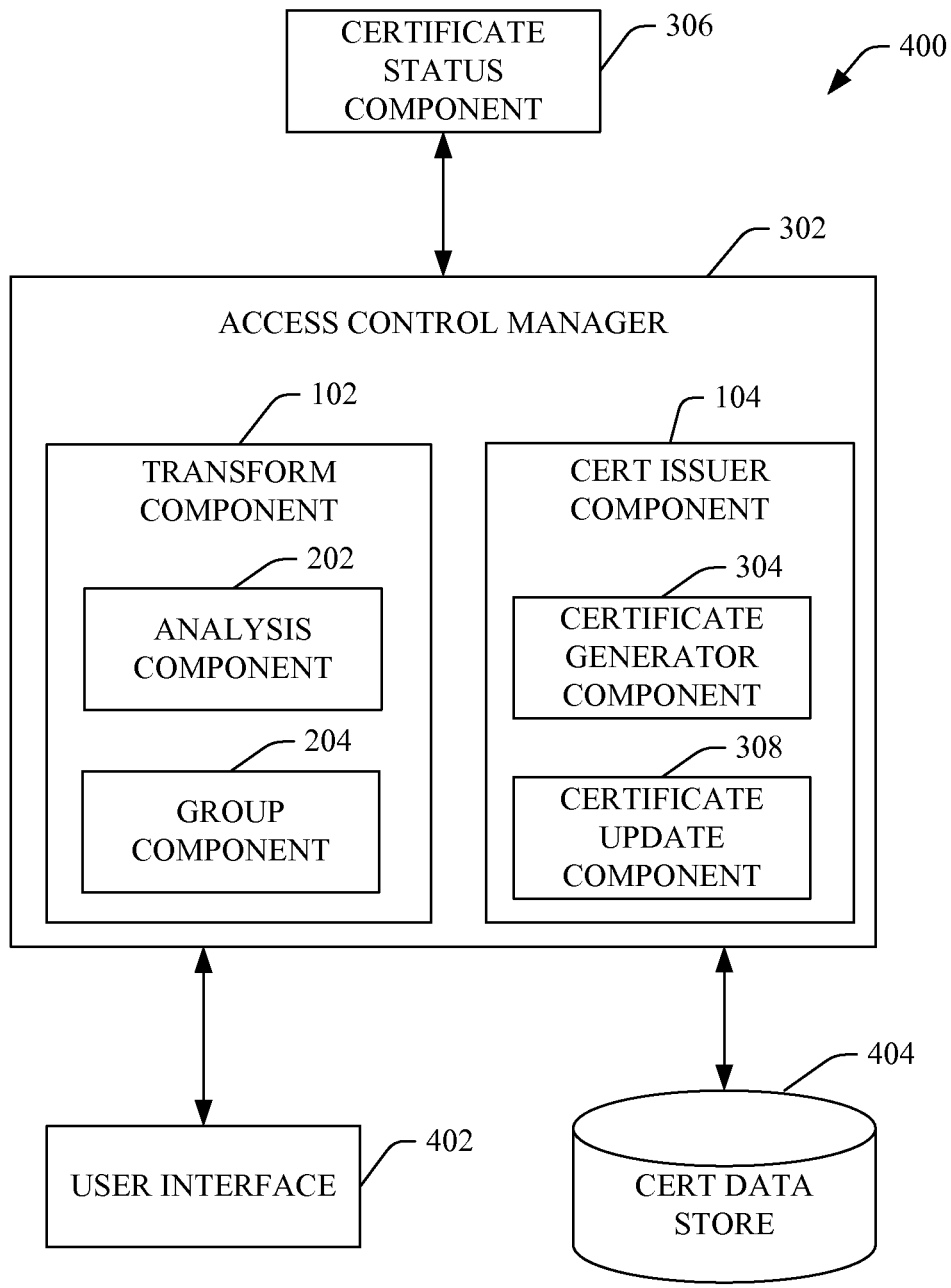
FIG. 4 is a block diagram of another system that facilitates access management utilizing certificates in accordance with an aspect of the subject matter disclosed herein.

Turning now to FIG. 4, another exemplary system 400 that facilitates access management is illustrated. System 400 can include a user interface 402, such as a graphic user interface (GUI). System administrators or other users can utilize the user interface 402, to create, manage and manipulate ACL information, which can be used by the system 400 to generate certificates. The user interface 402 can allow administrators to continue to think of access management in terms of ACLs and specify access policy as though access to resources was directed by one or more ACLs.

The system 400 can also include a certificate data store 404 that can maintain certificate information. In particular, the certificate data store 404 can hold certificates for distribution to entities, resource managers or other parties. Certificates can be distributed by posting on a directory available via computer network, email or any other delivery mechanism. The certificate data store 404 can be remotely located or incorporated within the access control manager 302. In addition, the certificate data store can maintain information describing currently issued certificates. This information can be used for comparison when new certificates are generated to determine when certificates are no longer valid. This information can be used to update the certificate status component 306.

Figure 5:
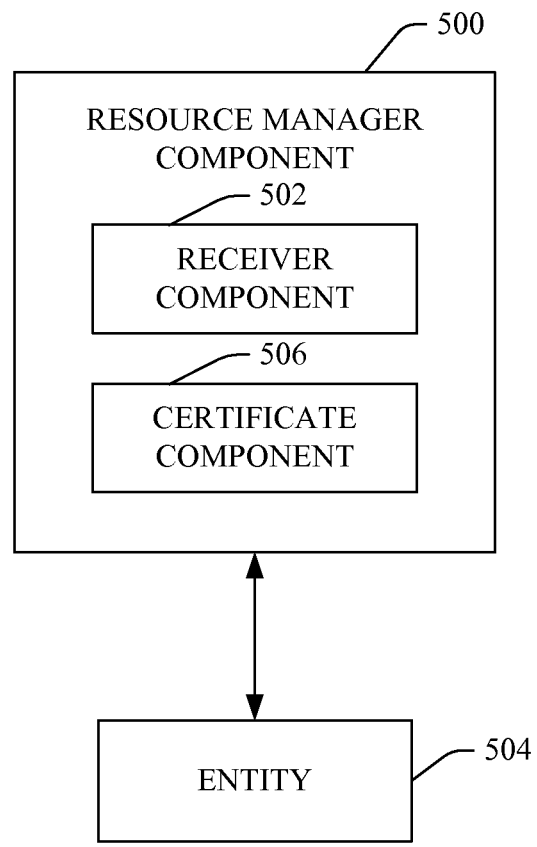
FIG. 5 is a block diagram of a resource manager that utilizes certificates to manage access to a resource in accordance with an aspect of the subject matter disclosed herein.

Referring now to FIG. 5, an exemplary resource manager component 500 is illustrated. The resource manager component 500 can include a receiver component 502 that can receive requests to access resources, including, but not limited to, network access and document access (e.g., word-processing documents, spreadsheets and the like). The requests can be received from one or more entities 504 (e.g., individuals and automated software programs). Access requests can include information identifying the entity as well as the requested resource. In addition, an access request can include a certificate that attests to the access rights of the entity 504.

Resource manager component 500 can include a certificate component 506 that evaluates received access right certificates. The certificate component 506 can decrypt or read the certificate to ensure that the certificate applies to the entity requesting access and that the certificate applies to the resource for which access is requested. The certificate component 506 can also verify that the certificate issuer has the proper authority to issue the certificate.

The certificate component 506 can also determine whether the certificate is currently valid. Certificates can be limited to a specific period of time, referred to herein as the certificate lifetime. After the certificate lifetime, the certificate is expired and can no longer be used as evidence of access rights. Also, the certificate lifetime can specify a commencement time and date. Prior to commencement of the certificate lifetime, the certificate cannot be used to prove access rights.

Figure 6:
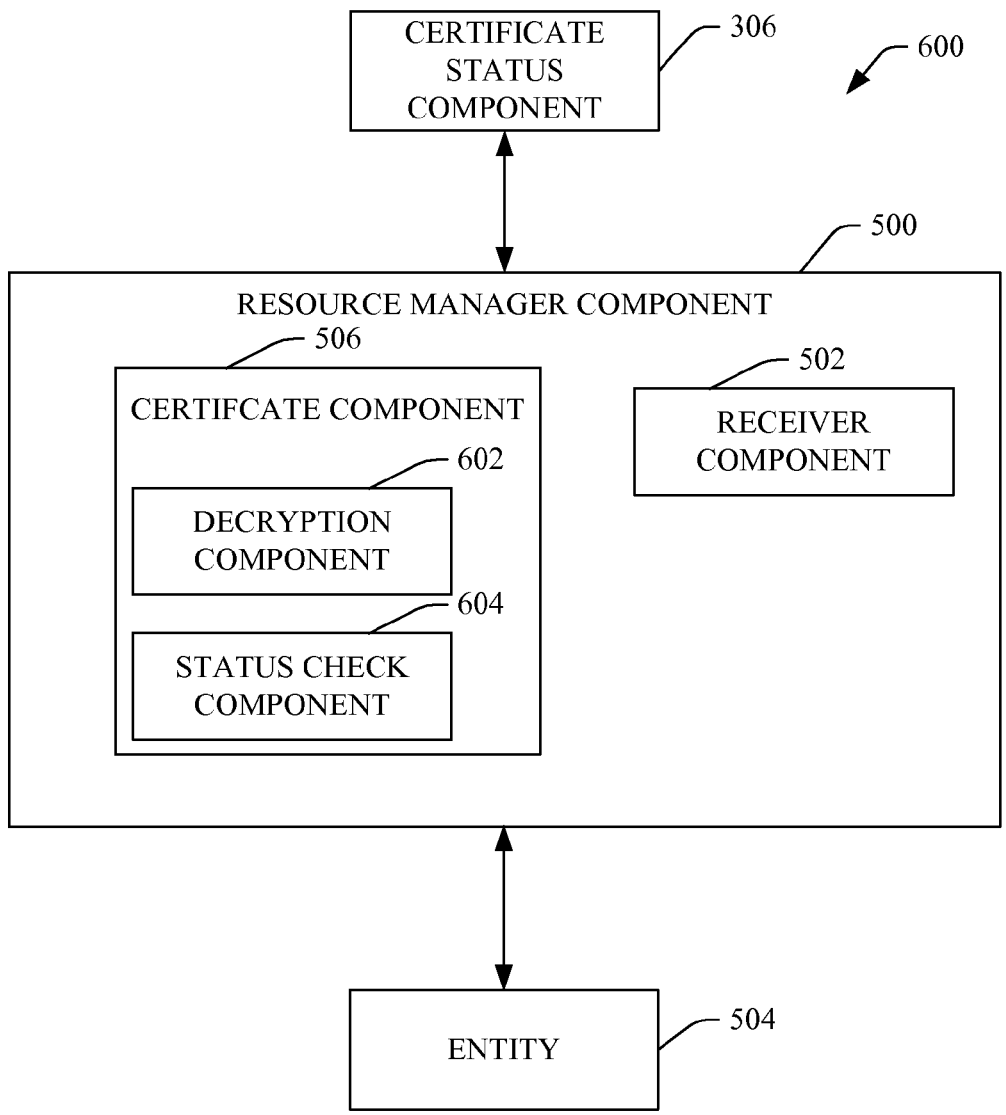
FIG. 6 is a block diagram of a resource manager that utilizes certificates to manage access to a resource in accordance with an aspect of the subject matter disclosed herein.

Referring now to FIG. 6, an exemplary system 600 that verifies certificate status is illustrated. The system 600 can include a resource management component 500 as described with respect to FIG. 5. In addition, the certificate component 506 can include a decryption component 602 that is capable of decrypting received certificates to evaluate the certificate validity. For example, decrypted contents of the certificate can verify the entity, the resource and certificate issuer.

The certificate component 506 can also include a status check component 604 that checks whether the certificate is valid. The status check component 604 can contact a certificate status component 306 to verify that the certificate is currently valid and has not been revoked. The certificate status component 306 can maintain status for certificates issued by one or more access control managers, similar to an online certificate status protocol (OCSP).

In other aspects, the certificate may not be presented to the resource manager component 500 by the entity 504. In such cases, the certificate component 506 can request the certificate from an access control manager directly. Alternatively, an intermediary component (not shown) can manage a set of certificates for one or more entities. The resource manager component 500 can obtain access right certificates from the intermediary component upon request.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components.

The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

The disclosed subject matter can be further illustrated by the methodologies depicted in FIGS. 7-10. For purposes of simplicity of explanation, methodologies that can be implemented in accordance with the disclosed subject matter can be shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
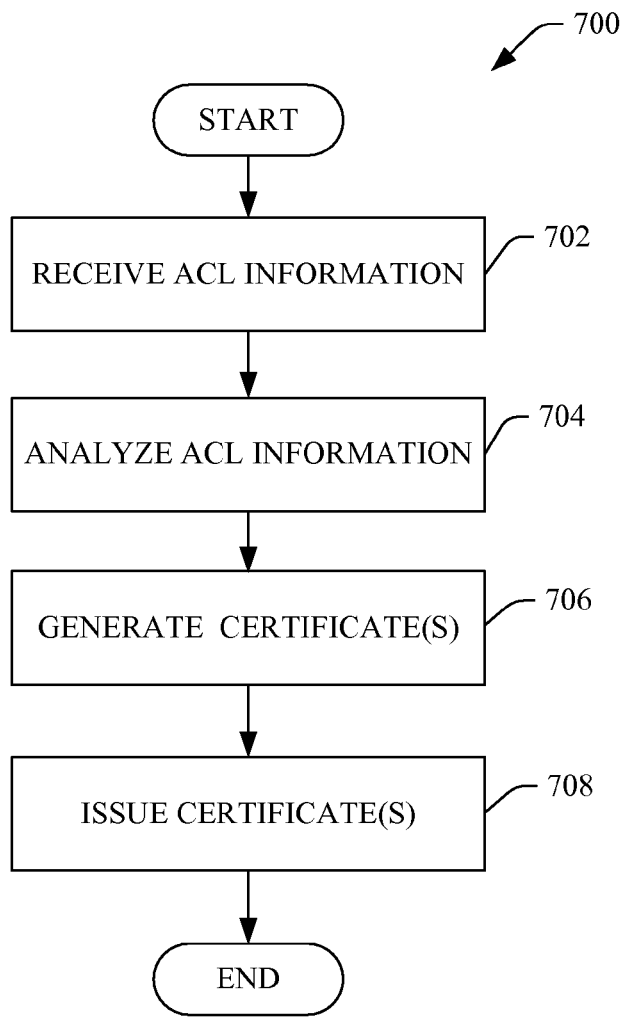
FIG. 7 illustrates an exemplary methodology for generating certificates for access management in accordance with an aspect of the subject matter disclosed herein.

Referring now to FIG. 7, an exemplary methodology 700 for mapping ACL information to a set of certificates is illustrated. At 702, ACL information can be received via a user interface, data file or any other mechanism. ACL information can include a text specification of an ACL, any logic structure describing an ACL or any other information related to an ACL. At 704, the received ACL information can be analyzed to determine access policy.

A set of certificates can be generated based upon the analysis of the received ACL information at 706. The logic embodied in the ACL information can be mapped or transformed to a set of certificates. More particularly, the order dependent logic expressed within the ACL information can be mapped to a set of order independent certificates. At 708, the set of certificates can be issued to control access to one or more resources.

Figure 8:
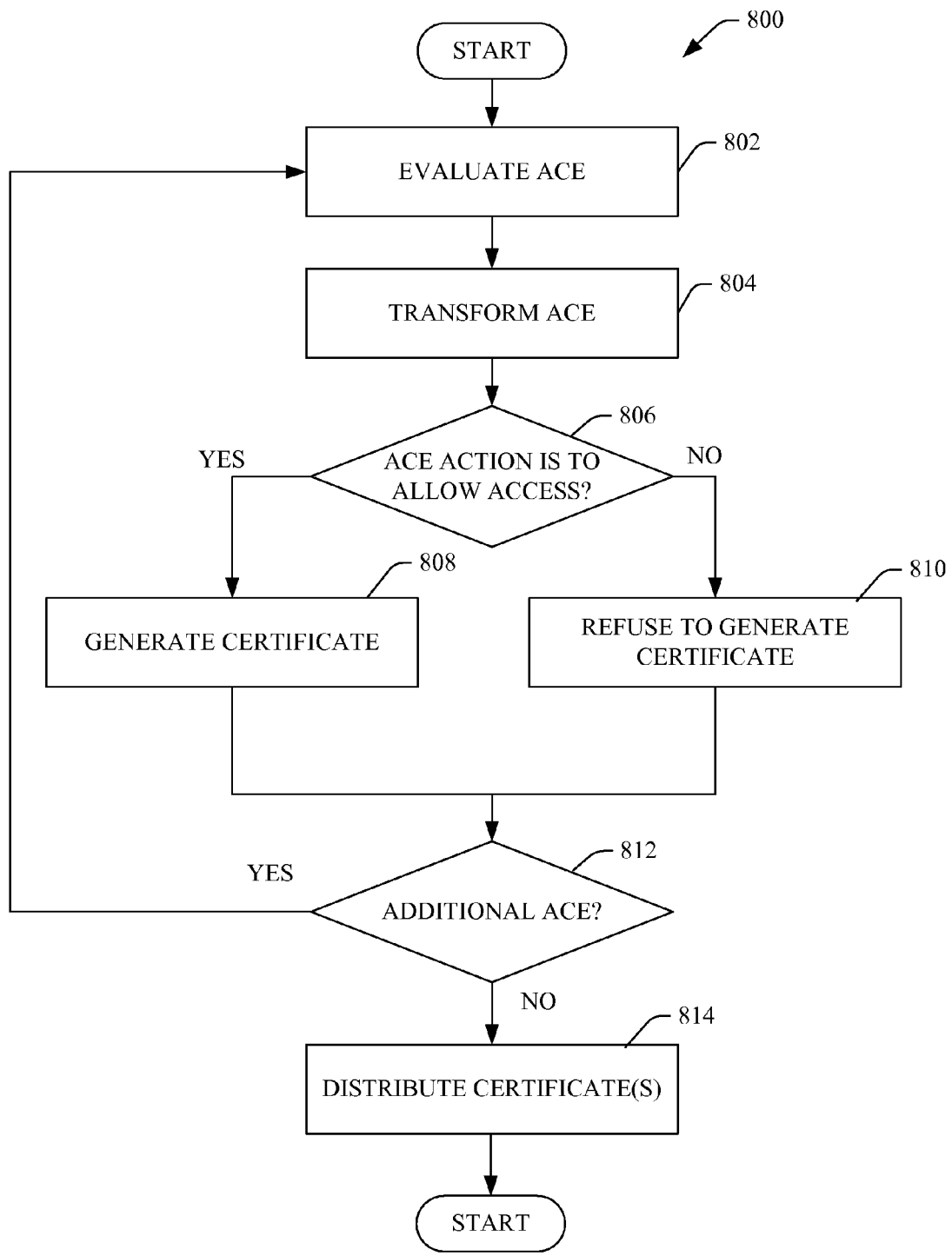
FIG. 8 illustrates a methodology for generating certificates from ACL information in accordance with an aspect of the subject matter disclosed herein.

FIG. 8 illustrates an exemplary methodology 800 for generating certificates from ACL information. At 802, an ACE is evaluated. Evaluation of an ACE can encompass analysis not only of the subject, actions and any other information within the ACE, but also analysis of the position of the ACE within the ACL list. Since ACL lists are typically processed sequentially, access logic expressed by an ACE depends not only in the information within that ACE, but also on all ACEs that preceded the particular ACE within the ACL.

At 804, the access logic implicit in the position of the ACE and the subject of the ACE can be transformed or translated to generate order independent access logic. In particular, each ACE can be represented as the subject of the original ACE, excluding the subject of any ACEs that preceded the ACE in the ACL list. The order independent access logic can be implemented using one or more a set of certificates.

At 806, a determination can be made as to whether the action associated with the ACE is an ALLOW action or other grant of access right. If the action grants access rights, entities described in the new, transformed subject are allowed access and one or more certificates can be generated at 808. The certificate servers as a positive grant of authority to access the associated resource. If the action is not an ALLOW action or other access right, no certificate is generated at 810. The entity will be denied access based upon the lack of certificate.

At 812, a determination is made as to whether there are additional ACEs to evaluate within the ACL. If yes, the next ACE within the ACL is processed sequentially when the process returns to 802. If no, the process continues at 814, where the generated certificates are distributed. The certificates can be distributed to entities for use in accessing resources. If a status checking component or system is utilized, a status manager can also be provided with updated information regarding issued certificates.

Figure 9:
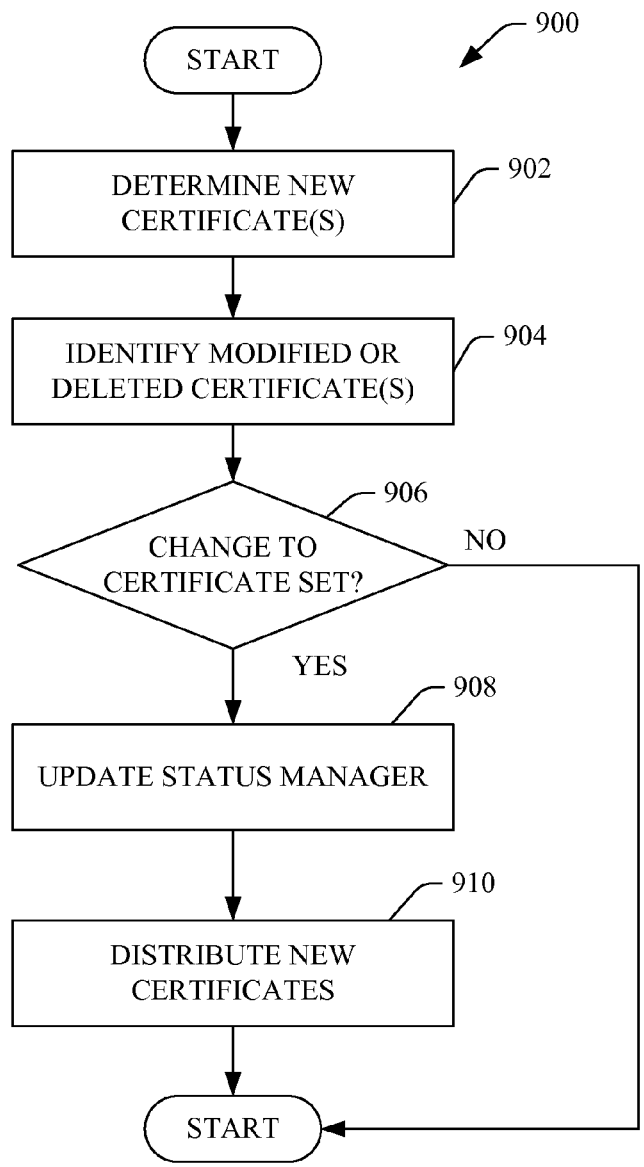
FIG. 9 illustrates a methodology for providing certificate status information in accordance with an aspect of the subject matter disclosed herein.

Referring now to FIG. 9, an exemplary methodology 900 for providing certificate status information is illustrated. At 902, a set of new certificates can be generated. Certificates can be generated periodically. Alternatively, generation of certificates can be triggered by an update or modification of the ACL on which the certificates are based. At 904, the newly generated set of certificates can be compared to a previously generated set of certificates. In particular, prior certificates that are not included in the set of certificates are identified for revocation. In addition, certificates that have been modified can be identified. For example, a certificate where the permissions have changed from read/write to read only would be identified.

At 906, a determination can be made as to whether any changes to the set of certificates have been made. Changes can include addition of new certificates, deletion of certificates and/or modification of certificates. If no, the process can end without requiring update of the certificate status component or manager, since there is no change. However, if there are changes to the certificates, the certificate status component can be notified at 908. The certificate status component can receive information regarding new certificates. In addition, any certificates that have been deleted from the set of certificates can be considered invalid. If a resource manager queries the certificate status component for the current state of such certificates, the certificates will be considered invalid. At 910, any new or updated certificates can be distributed to entities, resources, or any other interested party. Distribution can be accomplished through any suitable mechanism including, but not limited to, electronic mail, or posting to a directory available via computer network.

Figure 10:
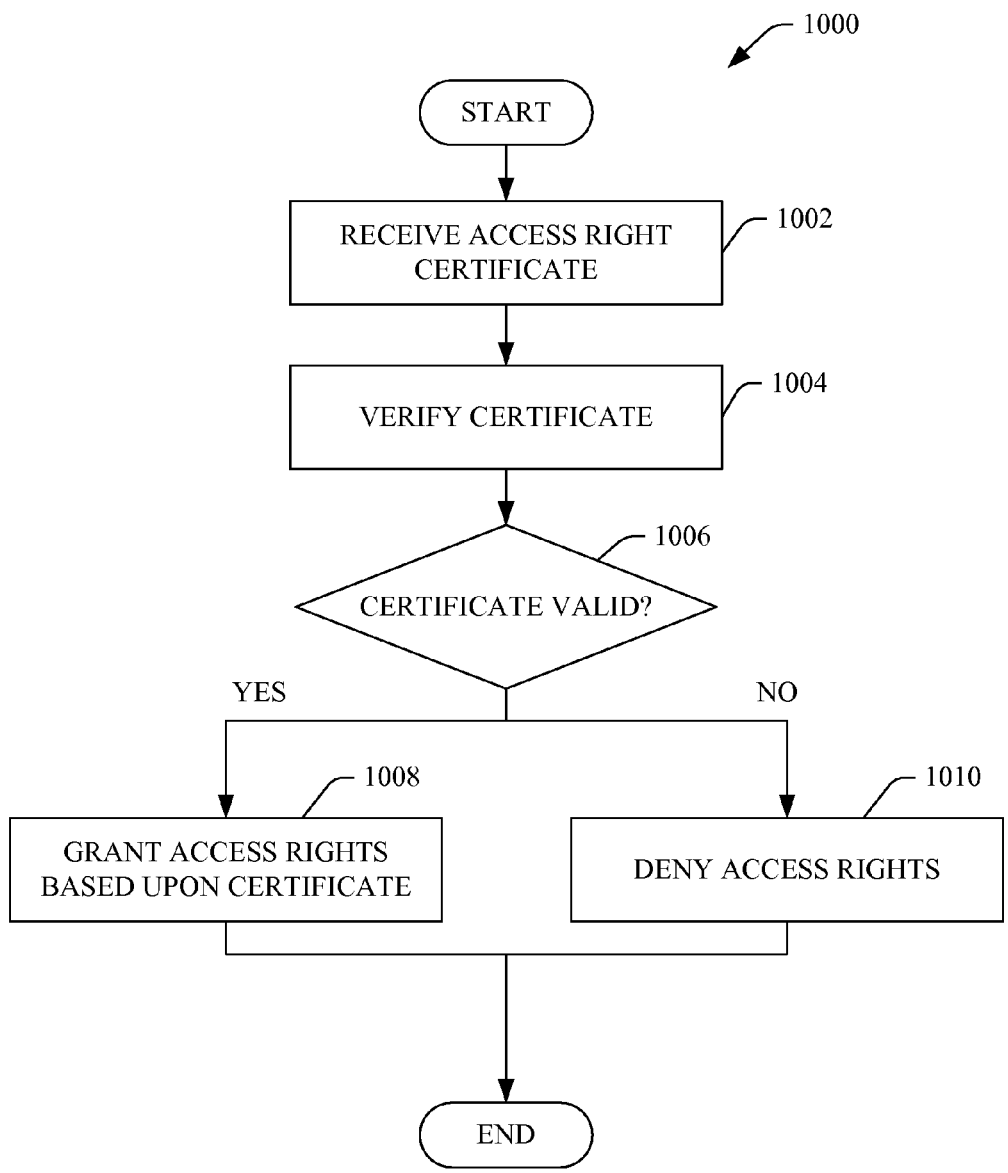
FIG. 10 illustrates a methodology for determining access to a resource utilizing access right certificates in accordance with an aspect of the subject matter disclosed herein.

Turning now to FIG. 10, an exemplary methodology 1000 for determining access to a resource utilizing access right certificates is illustrated. At 1002, a certificate providing evidence of access rights is presented. The certificate can be obtained from the entity to which the certificate refers, from an issuing authority or from an intermediary.

At 1004, the certificate can be verified. Verification can include decryption of the certificate to ensure that the certificate references the entity and the resource in question. In addition, the certificate can be time sensitive and can include an expiration time. Verification can include determining whether the certificate has expired. In other aspects, verification can include on online status check of the certificate. A certificate status component can be queried to verify current status of the certificate and ensure that the certificate has not been revoked.

At 1006, a determination is made as to whether the certificate is valid based upon the verification. If the certificate is valid, the entity is determined to have access rights, and access to the resource can be granted based upon rights specified in the certificate at 1008. For example, the access rights can specify limited permissions (e.g., read, write). If the certificate is not valid, the entity denied access to the resource at 1010.

Figure 11:
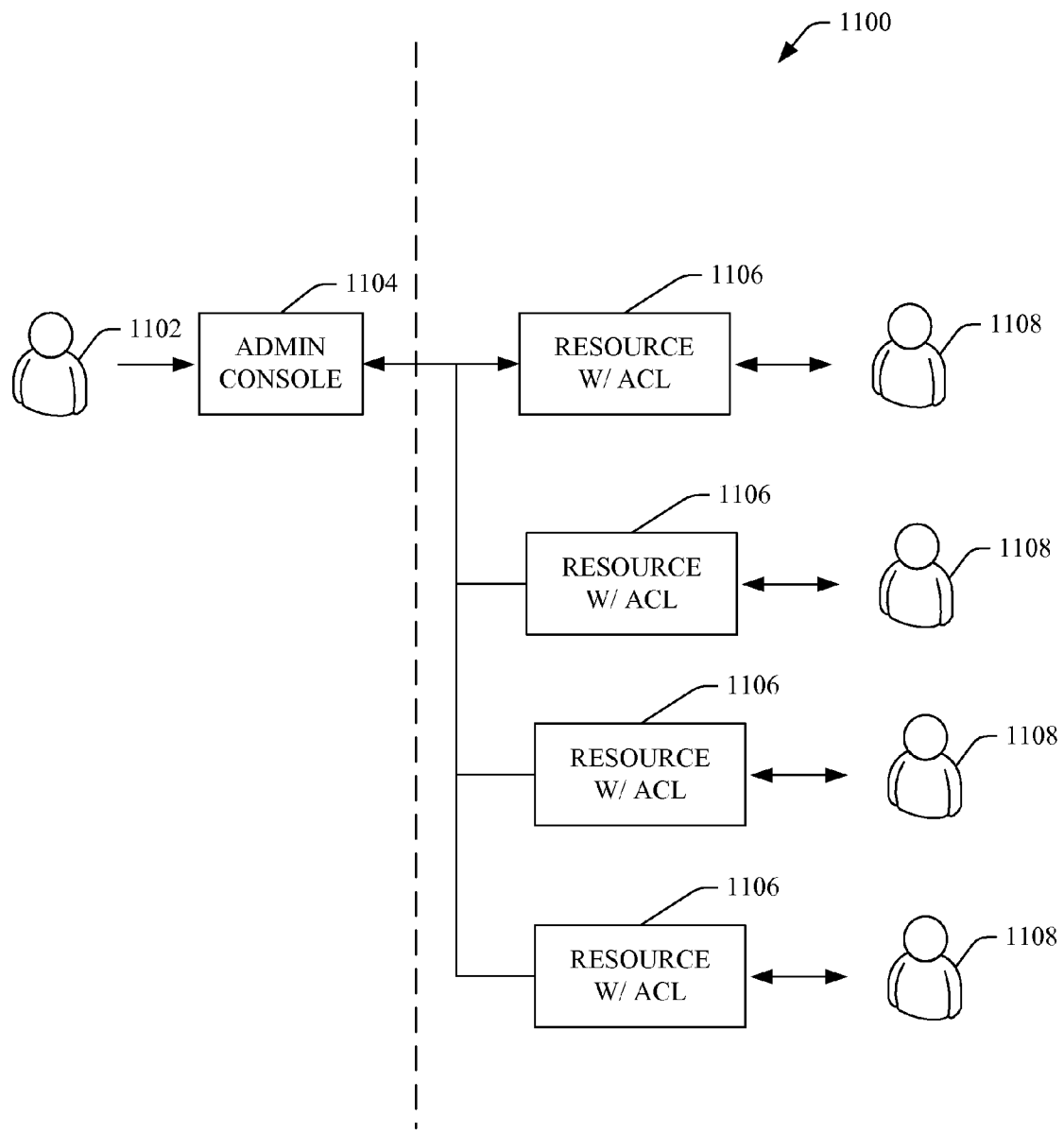
FIG. 11 illustrates an exemplary access control system utilizing a distributed set of ACLs.
Figure 12:
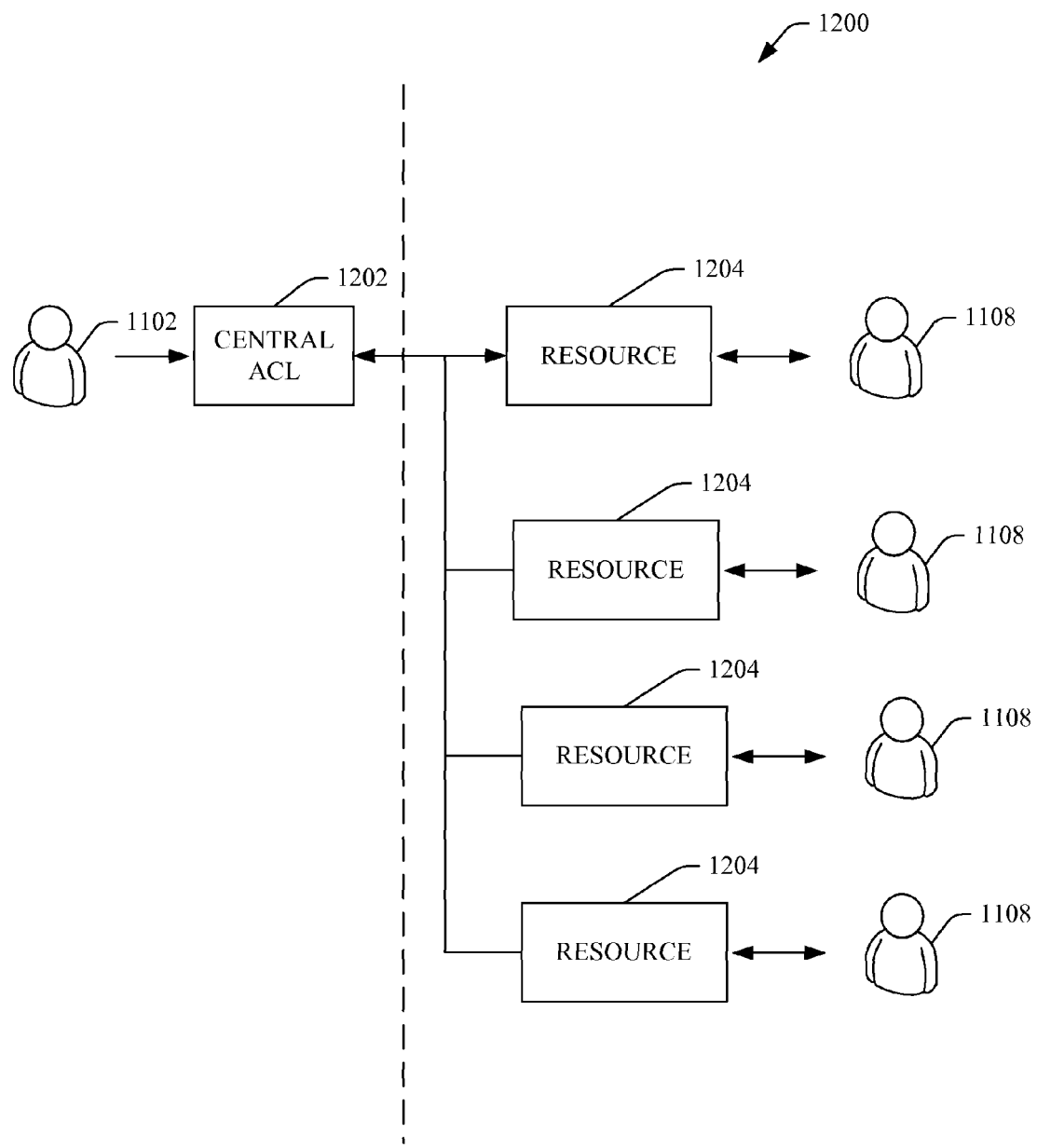
FIG. 12 illustrates an exemplary access control system utilizing a central ACL.
Figure 13:
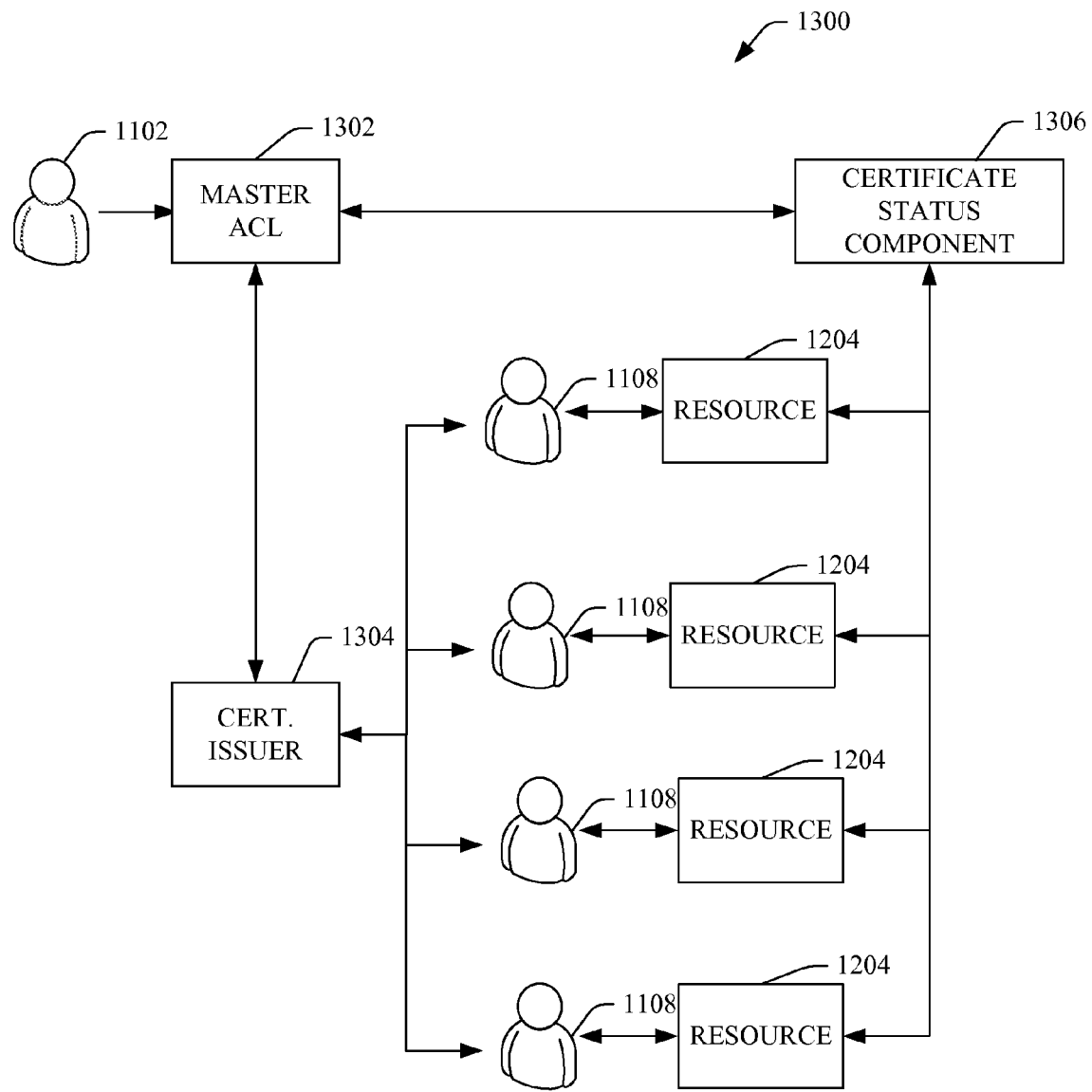
FIG. 13 illustrates an exemplary access control system utilizing certificates in accordance with an aspect of the subject matter disclosed herein.

FIGS. 11-13 illustrate issues in managing access in a distributed system. The figures illustrate various exemplary system implementations and describe possible issues and possible communication problems.

Referring now to FIG. 11, an exemplary access control system 1100 utilizing a distributed set of ACLs is illustrated. A system administrator 1102 can create, delete and manage a set of ACLs for one or more resources 1106 utilizing a system administrator's console 1104. The administrator's console 1104 can be any computer, terminal or other computing device. ACLs can be distributed to one or more resources or resource managers 1106. When users or other entities 1108 desire access to a resource 1106, the ACL associated with, or maintained at, the resource can be consulted to determine whether to allow access or appropriate permissions.

Modification of access control in the system 1100 can be effected by modifying the individual ACLs that hold the access policy. The system administrator 1102 can decide on a change of policy and express the change in policy via the administrator's console 1104. The change in policy then propagates from the administrator's console 1104 to the individual ACLs where the policy is stored. This propagation may be automatic as in the case of Group Policy of Windows operating system. Alternatively, this propagation may require human direction, such as the Microsoft Management Console (MMC) or Windows Management Interface (WMI).

Updates are dependent upon connectivity between the administrator console 1104 and the resources or resource manager 1106. Network communications can be unreliable. When an ACL affected by a policy change is unreachable, the state of the policy will be inconsistent until network communications are restored. Consequently, some users requesting access to resources may observe different access behavior than other users.

Turning now to FIG. 12, an exemplary access control system 1200 utilizing a central ACL 1202 is illustrated. A system administrator 1102 can create, delete and manage a single ACL or set of ACLs maintained at a central location 1202. The central ACL 1202 can be used to manage access for a set of resources 1204. When users or other entities 1108 desire access to a resource, the resource or resource manager 1204 can contact the central ACL 1202 to determine whether to allow access or appropriate permissions. The resource 1204 can interrogate the central ACL over a network at every access request.

In this system 1200, all requesting entities 1108 will be consistent in terms of access policy, since the same, central policy 1202 is utilized by all resources 1204. However, network communications may fail between one or more of the resources 1204 and the central ACL 1202. If a resource 1204 is unable to access the central ACL 1202, the resource 1204 can refuse access to the user or entity 1108. Users 1108 are likely to be frustrated by a refusal where they should be granted access. Furthermore, users 1108 at other resources 1204 will likely be able to connect, leading to inconsistencies in provision of access. Alternatively, the resource manager 1204 can determine access using a cached copy of the ACL. However, the policy as maintained in the cache copy may be out of date and/or inconsistent with the central ACL policy 1202.

FIG. 13 depicts an exemplary access control system 1300 utilizing certificates. A system administrator 1102 can create, delete or manage policy using a master ACL 1302. A certificate issuer 1304 can utilize the access policy expressed in the master ACL 1302 to generate a set of certificates. The positive grant of authority, by certificate, can be delivered to an entity or user 1108. At the time of request, the entity or user 1108 can present the certificate to a resource manager. In this system 1300, when the entity 1108 has access to the resource 1204, the resource 1204 will also have access to the policy as expressed by the certificate. In addition, the policy authority does not need to know every resource that might be affected. The resource 1204 does not need to be in communication with any central authority.

The system 1300 can also include a certificate status component 1306 with authority to determine validity of certificates. When the master ACL 1302 is updated, the certificate issuer 1304 can issue new certificates and provide the certificate status component 1306 revoking expired components. The certificate status component can have the ability to verify a certificate, but need not have authority to issue certificates. When a certificate is presented to a resource manager 1204, the resource manager 1204 can contact the certificate status component 1306 to determine validity.

Alternatively, certificates can be issued with relatively short periods of validity. Certificates would expire on a regular basis and new certificates would be issued regularly. Changes to access policy would propagate as pre-existing certificates expired and were replaced by new certificates incorporating the policy changes.

Figure 14:
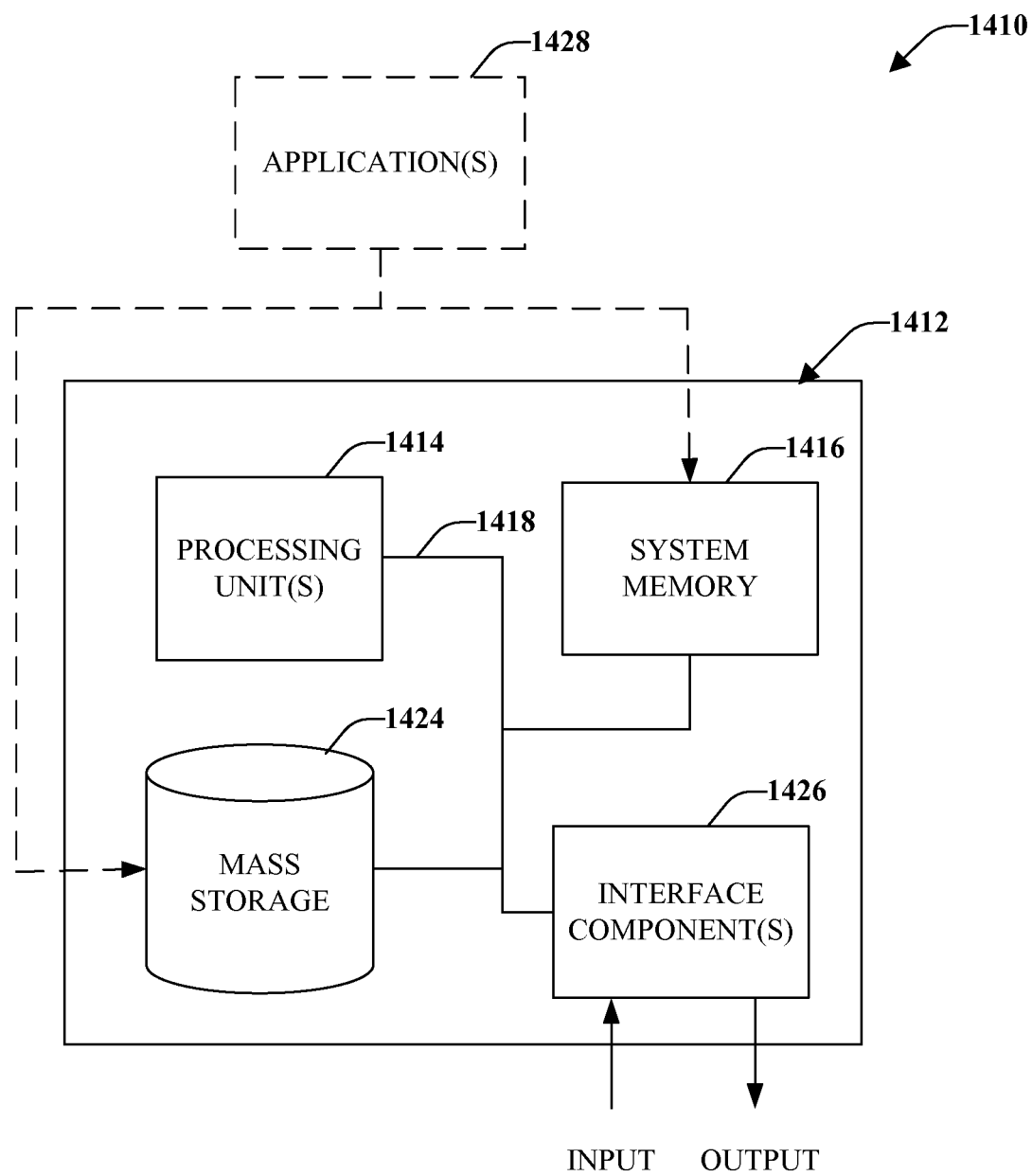
FIG. 14 is a schematic block diagram illustrating a suitable operating environment.
Figure 15:
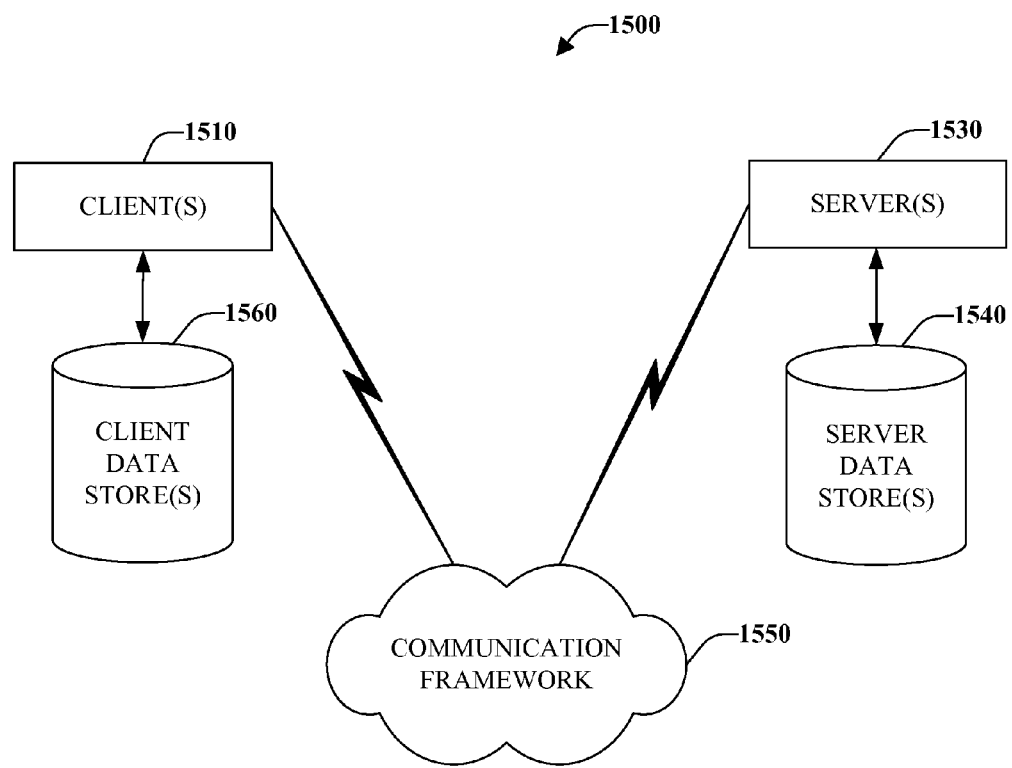
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject matter described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416, and a system bus 1418. The system bus 1418 couples system components including, but not limited to, the system memory 1416 to the processing unit 1414. The processing unit 1414 can be any of various available microprocessors. It is to be appreciated that dual microprocessors, multi-core and other multiprocessor architectures can be employed as the processing unit 1414.

The system memory 1416 includes volatile and nonvolatile memory. The basic input/output system (BIOS), containing the basic routines to transfer information between elements within the computer 1412, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1412 also includes removable/non-removable, volatile/non-volatile computer storage media. FIG. 14 illustrates, for example, mass storage 1424. Mass storage 1424 includes, but is not limited to, devices like a magnetic or optical disk drive, floppy disk drive, flash memory or memory stick. In addition, mass storage 1424 can include storage media separately or in combination with other storage media.

FIG. 14 provides software application(s) 1428 that act as an intermediary between users and/or other computers and the basic computer resources described in suitable operating environment 1410. Such software application(s) 1428 include one or both of system and application software. System software can include an operating system, which can be stored on mass storage 1424, that acts to control and allocate resources of the computer system 1412. In particular, operating system can include diagnostic components capable of monitoring and averting failure of a hard disk drive. Application software takes advantage of the management of resources by system software through program modules and data stored on either or both of system memory 1416 and mass storage 1424.

The computer 1412 also includes one or more interface components 1426 that are communicatively coupled to the bus 1418 and facilitate interaction with the computer 1412. By way of example, the interface component 1426 can be a port (e.g., serial, parallel, PCMCIA, USB, FireWire . . . ) or an interface card (e.g., sound, video, network . . . ) or the like. The interface component 1426 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1412 to output device(s) via interface component 1426. Output devices can include displays (e.g., CRT, LCD, plasma . . . ), speakers, printers and other computers, among other things.

FIG. 15 is a schematic block diagram of a sample-computing environment 1500 with which the subject matter can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the aspects of the subject innovation, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530. Both the one or more client data store(s) 1560 and the one or more server data store(s) can utilize hard disk drives to maintain data. Both client(s) 1510 and server(s) 1530 can utilize a diagnostic component to prevent failure of data stores and mitigate loss of data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer system comprising at least one processor that facilitates group management for use access control, the computer system comprising:
   at least one computer-readable storage medium comprising a plurality of computer-executable instructions that, responsive to execution by the at least one processor, implement a plurality of components comprising:
   a transform component configured to transform access control list information comprising a plurality of entries arranged in an order into a set of order independent certificates that are independent of the order, and grant access rights to at least one resource, wherein:
   the transform component is configured to transform at least one entry from the plurality of entries that indicates at least one first group into an order independent certificate from the set of the order independent certificates by evaluating entries in the access control list information that precede the at least one entry, and
   the order independent certificate is generated for at least one second group that is represented using the at least one first group in accordance with a result of the evaluation of the entries in the access control list information that precede the at least one entry;
   a certificate component configured to issue the set of certificates; and
   a group component that configured to manipulate one or more groups specified in the access control list information to produce order-independent logic as a function of an access control policy.

2. The computer system of claim 1, wherein the plurality of components further comprise an analysis component configured to analyze the access control list information to determine the access control policy.

3. The computer system of claim 2, wherein the analysis component is configured to analyze an entry in the access control list information as a function of position within the access control list information.

4. The computer system of claim 2, wherein the plurality of components further comprise a status component configured to maintain validity information for one or more of the certificates.

5. The computer system of claim 4, wherein the group component is configured to utilize a subtraction group to produce the order independent logic.

6. The computer system of claim 1, wherein the plurality of components further comprise a certificate update component configured to provide status information to an online status component.

7. The computer system of claim 6, wherein the status information is determined as a function of a comparison between the set of certificates and a prior set of certificates.

8. The computer system of claim 1, further comprising a user interface configured to allow a user to manage the access control list information.

9. The computer system of claim 1, further comprising a certificate data store configured to maintain the set of certificates for distribution.

10. The computer system of claim 1, wherein at least one certificate of the set of certificates includes a specified lifetime.

11. The computer system of claim 1, wherein the plurality of components further comprise a certificate issuer component configured to distribute the set of certificates to at least one of an entity, a resource manager, an intermediary, or any combination thereof.

12. In a computer system comprising at least one hardware processor, a method for managing access to resources utilizing certificates, comprising:
    with the at least one hardware processor:
        analyzing an access control list comprising a plurality of entries arranged in an order, the plurality of entries comprising:
            at least one first entry comprising an indication that at least one type of access for at least one first entity is allowed; and
            at least one second entry comprising an indication that the at least one type of access for at least one second entity is denied;
        manipulating one or more groups specified in the access control list to produce order-independent logic as a function of an access control policy associated with the access control list; and
        generating, using the order-independent logic, at least one certificate that is independent of the order, based on the at least one first entry in the access control list, by analyzing entries in the access control list preceding the at least one first entry,
        wherein the at least one certificate is generated for at least one third entity represented using the at least one first entity and excluding the at least one second entity, and wherein the at least one certificate acts as evidence that the at least one type of access is allowed.

13. The method of claim 12, further comprising comparing the at least one certificate to a prior certificate to determine status information.

14. The method of claim 13, further comprising providing the status information to a status monitor configured to maintain the status information for the at least one certificate.

15. The method of claim 12, further comprising distributing the at least one certificate to an entity to provide access to a resource.

16. The method of claim 12, further comprising evaluating a position of the at least one first entry in the access control list, and generating the at least one certificate is based at least in part upon the position of the at least one first entry within the access control list.

17. The method of claim 12, wherein the at least one certificate has a predetermined period of validity.

18. The method of claim 12, further comprising providing a graphic user interface that allows for management of the access control list.

19. A computer-readable storage device storing computer-executable instructions that are executable by one or more computing device to perform operations comprising:
    analyzing an access control list including a plurality of entries arranged in an order, the plurality of entries including:
        at least one first entry including an indication that at least one type of access for at least one first entity is allowed; and
        at least one second entry including an indication that the at least one type of access for at least one second entity is denied;
    manipulating one or more groups specified in the access control list to produce order-independent logic as a function of an access control policy associated with the access control list; and
    generating, using the order-independent logic, at least one certificate that is independent of the order, based on the at least one first entry in the access control list, by analyzing entries in the access control list preceding the at least one first entry, the at least one certificate being generated for at least one third entity represented using the at least one first entity and excluding the at least one second entity, and the at least one certificate acting as evidence that the at least one type of access is allowed.

20. The computer-readable storage device of claim 19, wherein the operations further comprise comparing the at least one certificate to a prior certificate to determine status information.

* * * * *